United States Patent

[11] 3,619,487

[72] Inventors Ronald Richard Norley; Robert Dale Altmanshofer, both of Indianapolis, Ind.
[21] Appl. No. 36,045
[22] Filed May 11, 1970
[45] Patented Nov. 9, 1971
[73] Assignee RCA Corporation

[54] SELECTIVELY OPERATED TINT CORRECTION CIRCUIT
9 Claims, 1 Drawing Fig.

[52] U.S. Cl. ........ 178/5.4 HE, 307/262, 307/264, 328/155
[51] Int. Cl. ........ H04n 9/50
[50] Field of Search ........ 307/262, 264; 323/121; 325/487; 328/155; 178/5.4 R, 5.4 HE, 5.4 SD

[56] References Cited

UNITED STATES PATENTS

| | | | |
|---|---|---|---|
| 2,888,514 | 5/1959 | Pritchard | 178/5.4 HE |
| 3,525,802 | 8/1970 | Whiteneir | 178/5.4 HE |

*Primary Examiner*—Robert L. Griffin
*Assistant Examiner*—George G. Stellar
*Attorney*—Eugene M. Whitacre

ABSTRACT: A tint correction circuit utilizes a unidirectional current conducting device which is coupled to the input of a demodulator circuit, and a transistor whose collector electrode is coupled through a resistive impedance to the output terminal of the demodulator. The anode of the diode and the base electrode of the transistor are coupled together through a suitable impedance to which is also coupled a switch. The cathode of the diode is returned to reference potential through a capacitor.

During a first mode of operation, with the switch in the "off" position, the diode rectifies certain polarity AC signals applied to the input of the demodulator and produces a DC voltage across the capacitor. This DC voltage renders the transistor nonconductive. This results in a normal demodulation operation for the demodulator.

When the switch is closed or in the "on" position, a voltage is applied to forward bias both the diode and the transistor. This action serves to shift the phase of the signals applied to the inputs of the demodulators while reducing the amplitude of the demodulated signals obtained at the output terminal of the demodulator.

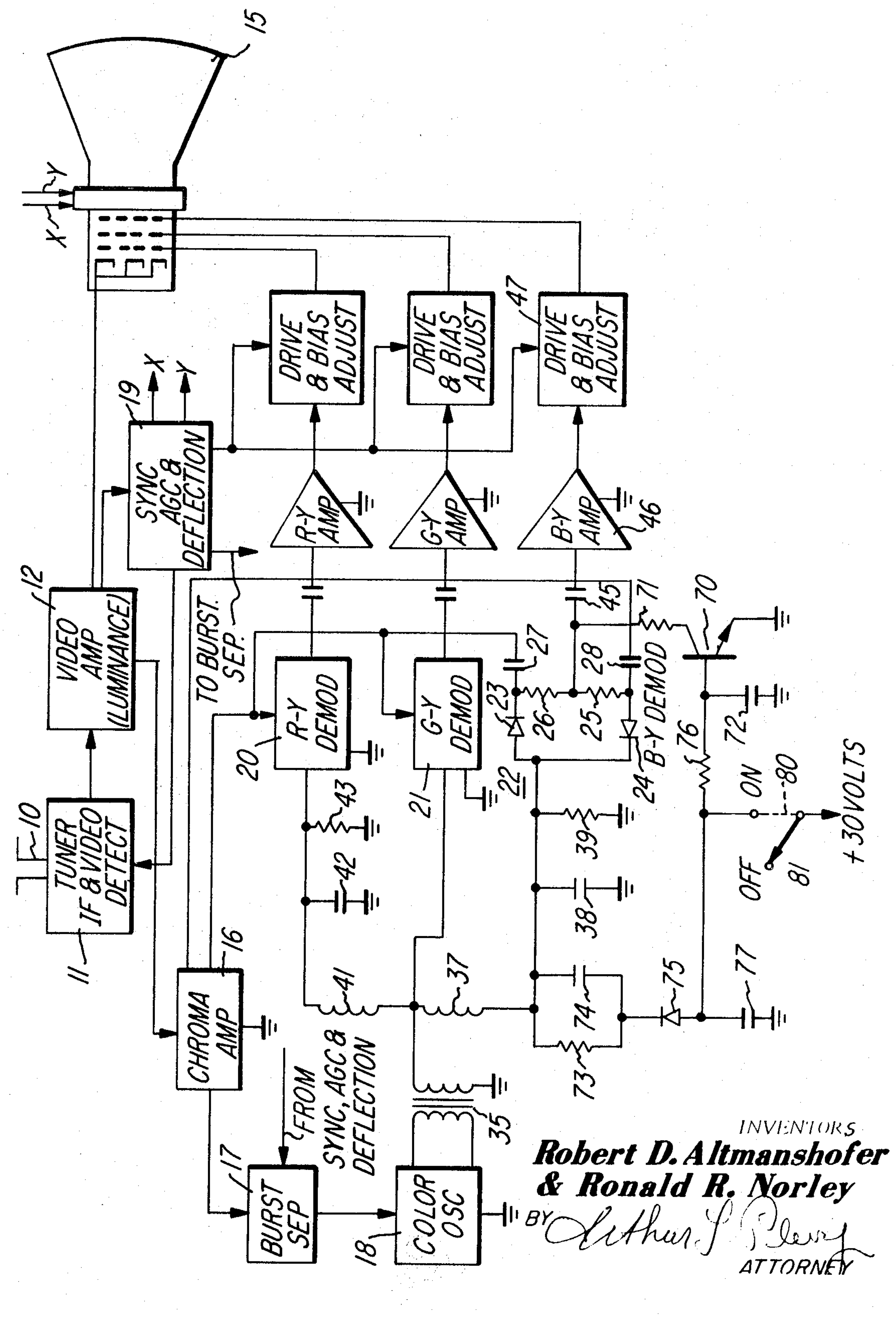
INVENTORS
Robert D. Altmanshofer
& Ronald R. Norley
BY [signature]
ATTORNEY

SELECTIVELY OPERATED TINT CORRECTION CIRCUIT

This invention relates to color television receivers and more particularly to circuitry to enable color tint correction.

Presently it is known that due to various disturbances in the transmission of a television signal and due to various difficulties with studio standards, flesh tones as displayed on a conventional receiver sometimes appear with green or magenta casts.

In prior art receivers the tint control was used to affect the required readjustment in order to make the flesh tones appear proper. Certain receivers perform an automatic correction by operating to detect signals along the flesh tone axis and shift the phase thereof in order to correct for such errors. Such techniques are actually not correction techniques but serve to introduce predetermined distortion into the signal, as processed, to compensate for the adverse effects caused by these studio or phase disturbances. To accomplish adequate flesh tone reproduction, other receivers utilize, what can be generically called, a half-Q system. The Q signal and I signal are separated one from the other by 90° and are further specified in the NTSC standards. The I signal is formulated to correspond to the characteristics of the human eye in the medium sized detail region. The Q signal is 90° from the I signal and is used to reproduce colors for frequencies below about 500 kHz. A reduction in the amplitude of the Q signal, for example by one-half, limits the reproduction range of the receiver for such colors, hence the term "half-Q" is so utilized. Due to signal relations, a "half-Q" system is predominantly "I" signal responsive which signal is a major constituent in flesh tone reproduction. Therefore flesh tones in a "half-Q" system appear "more pleasing" because of the I signal domination. However, in lieu of the I-Q technique, a color difference demodulation may also be used by changing the phase of the reference signal as applied to the demodulators to provide, for example, R-Y and B-Y components. These signals differ in phase by about 33° from the I and Q signals. However, even with color difference demodulation the resultant vectors can always, in turn, be expressed in terms of the so-called I and Q signals. One prior art half-Q system operates under the control of the consumer via a suitable switch. In such a system the phase of the color subcarrier reference signal is selectively altered prior to application of that signal to the color demodulators. Simultaneously therewith, the output level of one or more of the demodulators is also reduced. The changing of reference phase and reduction of demodulator output amplitude results in a shifting of chrominance vectors towards the "so-called flesh axis" or I axis. The results, in general, serve to enhance flesh tones by limiting the response of the demodulators. As indicated, the consumer is provided with a switch to place the receiver in this "half-Q" mode of operation during an undesirable transmission. In using such switching techniques, care must be taken to prevent the long leads coupled between the switch and the demodulators from introducing undesirable stray capacitance and thereby effecting the bandwidth of the demodulators. Such leads further serve to act as radiators for the relatively high frequencies (i.e., 3.58 MHz and components) applied to the demodulators.

It is therefore an object of the present invention to provide an improved switching arrangement for use with a tint correction circuit.

A further object is to provide an improved tint correction switching arrangement wherein the demodulators are isolated from the necessary leads directed towards a suitable switch used for consumer selection of the tint correction mode.

A color television receiver embodying the invention includes a demodulator circuit for demodulating the chrominance components contained in a composite color television signal with respect to the phase and frequency of the reference subcarrier oscillator signal. To achieve tint correction the phase of the reference subcarrier signal applied to the input of the demodulators is altered and simultaneously therewith the amplitude at the output of one or more of the demodulators is reduced. The apparatus to accomplish this includes a transistor having an emitter electrode coupled to a point of reference potential and an impedance coupled between the collector electrode of the transistor and the output terminal of the demodulator. Coupled to the input terminal of the demodulator is a unidirectional current conducting device having a first terminal coupled to said input and a second terminal coupled to a capacitor. The unidirectional device rectifies certain polarity excursions of said reference oscillator signal to provide a DC voltage across said capacitor of a given polarity. Impedance means coupled between the capacitor and the base electrode of the transistor serves to apply the DC voltage to the base electrode of said polarity to reverse bias the transistor. Switching means coupled to said impedance means serve to forward bias both unidirectional device and the transistor during a first selectable mode. This forward bias causes a phase shift of said signals at the input of said demodulators while also serving to forward bias the transistor and thereby in conjunction with said impedance means serves to lower the amplitude of the demodulator at its output.

These and other objects of the present invention are more fully described with reference to the following specification when read in conjunction with the sole figure, which is a schematic diagram partially in block form of a color television receiver employing color tint correction circuitry according to this invention.

A television antenna 10 which is responsive to a transmitted television signal is coupled to the input of a tuner, intermediate frequency amplifier (I.F.), and video detector section 11. Section 11 supplies a video signal to a video amplifier or luminance channel 12 for application thereto to suitable electrodes of the kinescope 15, which may be a three gun shadow mask device. The video amplifier 12 is also coupled to the sync, AGC and deflection circuits 19. An amplified version of the video signal from amplifier 12 is also coupled to a chrominance amplifier 16. The output terminal of the chrominance amplifier 16 is coupled to a burst separator circuit 17. Burst separator 17 is keyed on during that portion of the horizontal interval containing the color burst signal. The burst separator 17 is coupled to a color oscillator 18, which provides a continuous wave output signal synchronized to the transmitted burst. The chrominance amplifier 16 is also coupled to inputs of three color demodulators 20, 21 and 22. Demodulator 22 (the B–Y demodulator) is shown as a double diode configuration comprising diodes 23 and 24. The anode of diode 23 is coupled to the cathode of diode 24. The anode of diode 24 is coupled to the cathode of diode 23 via the series resistors 25 and 26. The amplified chrominance signal obtained from chrominance amplifier 16 is applied via capacitor 27 to the junction between the cathode of diode 23 and resistor 26 and is also applied via capacitor 28 to the junction of diode 24 and resistor 25. The R–Y and G–Y demodulators 20 and 21 are shown in block form but can be the same circuit configuration and type shown in detail for the above-described B–Y demodulator.

The output of the color oscillator 18 is applied via a transformer 35 to the other inputs of the three demodulators 20, 21 and 22 to enable them to demodulate the chrominance signals from amplifier 16 with respect to the phase and frequency of the color oscillator signal. Accordingly, the secondary winding of transformer 35 is coupled to the B–Y demodulator via a first phase shifting network including inductor 37, capacitor 38 and resistor 39 to the junction between the anode of diode 23 and the cathode of diode 24.

The G–Y demodulator 21 receives color oscillator signal at a different phase via the direct connection of the input thereof to the secondary winding of transformer 35.

Similarly, the R–Y demodulator 20 receives still another phase of the color reference signal from the secondary winding of transformer 35 by the action of the phase shifting network including inductor 41, capacitor 42 and resistor 43. The B–Y output signal, for example is derived at the function between resistors 26 and 25 and is coupled via a capacitor 45 to the input terminal of a B–Y driver amplifier 46. The output of the amplifier 46 is coupled to the "blue" grid electrode of the kinescope 15 via a drive and bias adjust circuit 47. In a similar manner each of the outputs of the other demodulators, i.e., R–Y and G–Y, is coupled through a respective drive amplifier and bias adjust circuit to the corresponding grid electrode of the kinescope.

With respect to the circuitry just described, the operation of the color receiver is conventional. That is to say, the color demodulators 20–22 demodulate the chrominance components with respect to the phase and frequency of the color oscillator 18 signal as applied thereto to obtain conventional color difference signals of an amplitude and phase strictly in accordance to the information transmitted. This normal mode of operation provides the following proportional gains between the various signals, namely, if R–Y is equal to 1.0, then B–Y is equal to 1.2 and G–Y is equal to 0.30. The phase relationship between these signals using the B–Y signal at 0° as a reference phase place the R–Y vector at +105° with respect thereto and G–Y vector at +246° with respect thereto. However, as indicated above, changes in the transmitted signal due to propagation errors or studio lighting disturbances can cause a change in the phase of the color signal with respect to the reference signal. When this occurs, the color reproduction is altered. This alteration is most noticeable in the flesh tones associated with the faces of people being displayed on the viewing screen of the kinescope 15. Such tones, as is commonly known, tend to appear with green or magenta casts. To compensate for this effect there is shown a transistor 70 having a grounded emitter electrode and a collector electrode coupled via a resistor 71 to the output of the B–Y demodulator 22 at the junction between resistors 25 and 26. The base electrode of transistor 70 is bypassed for AC signals via a capacitor 72 coupled between the base electrode and ground. At the input to the demodulator 22 represented by the junction between inductor 37 and capacitor 38 is a further resistor-capacitor network comprising resistor 73 in shunt with capacitor 74. The other terminal of the shunt RC network is coupled to the cathode of diode 75 having its anode coupled to the base electrode of transistor 70 via a large resistor 76. The anode of diode 75 is also coupled to ground through a capacitor 77. The junction between capacitor 77 and resistor 76 is coupled to one terminal of a single pole, double throw switch 80. Switch 80 has its other terminal coupled to a source of operating potential designated as +30 volts and has a variable arm 81 which moves from the "off" position shown in the diagram, to the dashed line or "on " position serving to connect the +30 volt source to the junction between resistor 76 and capacitor 77. With the switch in the "off" position, the receiver operates as described above to demodulate and to provide color difference signals according to the above-described relationships. The operation in this "off" position is as follows. The diode 75 operates in conjunction with capacitor 77 to peak detect the negative excursions of the color reference oscillator signal to provide across capacitor 77 a negative charge. The diode 75 is otherwise normally reverse biased except during the negative peaks of the color reference signal. Therefore, resistor 73 and capacitor 74 have little effect on the phase of the reference signal. The negative voltage developed across capacitor 77 serves to maintain transistor 70 reverse biased when switch 80 is in the "off" position due to the action of the negative potential applied to the base electrode via resistor 76. When the switch 80 is placed in the "on" position, he full positive potential (+30 volts) is applied to diode 71 causing it to conduct. This action places capacitor 74 and resistor 73 in parallel with capacitor 38 and resistor 39. Adding this shunt network of capacitor 74 and resistor 73 across the above-mentioned components causes the phase of the reference signal as applied to the B–Y demodulator to be shifted in phase by about 20° negative with respect to the above-mentioned 0° phase. The insertion of resistor 73 and capacitor 74 also serves to change the loading on the secondary winding of transformer 35, simultaneously causing the reference signal as applied to the G–Y and R–Y demodulators to be shifted respectively about 10° positive with respect to the above-mentioned 0° phase. This then causes the vector representative of the R–Y signal to be placed at a position of about 115° with respect to the 0° reference and the G–Y vector to be placed at about 256° with respect to the 0° reference. With switch 80 in the "on" position, as described, the +30 volts is also applied to the base electrode of transistor 70 via resistor 76. This causes transistor 70 to become saturated, thereby returning resistor 71 to the point of reference potential through the low collector to emitter impedance path of transistor 70. This action effectively grounds resistor 71 causing it to load the output of the B–Y demodulator, thereby lowering the B–Y input to the B–Y amplifier 46. The total action results in the following demodulation relationships whereby, if R–Y equals 1.0 B–Y equals 0.8 and G–Y equals 0.30. These amplitude relationships including the above-mentioned phase relations provide a good compromise between displaying the most pleasing overall colors, while minimizing the adverse effects of changes in the transmitted signal as affecting the display of flesh tones. The resultant signals provided can be then extrapolated as described above, to operate as according to a "half-Q" mode.

It might be noted that similar functions could be accomplished by an ordinary switch which grounds resistor 73 and capacitor 74 and resistor 71. However, as was indicated above, it is required that switch 80 be a customer controlled switch in order that the consumer has the capability of viewing a good transmission utilizing the full capability of the demodulating circuitry. Since the switch 80 is a customer operated control, the lead from resistor 71 and the shunt combination of resistor 73 and capacitor 74 would add additional capacitance to the circuit because of the lead length, thus resulting in a further undesirable reduction in the B–Y bandwidth.

Furthermore, the lead as associated with resistor 73 and capacitor 74 could cause excessive color reference oscillator signal radiation, which radiation would tend to effect various other circuits associated with the receiver. These problems are avoided by the above-described techniques.

Below is a tabulation of component values which operate to provide the above-described advantages:

| | |
|---|---|
| Transistor 70 | RCA Pt. 01473538-1 |
| Diodes 23 and 24 | RCA Pt. 0972258-8 |
| Resistors 25 and 26 | 8,200 ohms |
| Resistors 39 and 43 | 2,200 ohms |
| Resistor 71 | 10,000 ohms |
| Resistor 73 | 6,800 ohms |
| Resistor 76 | 270,000 ohms |
| Capacitor 74 | 20 micromicrofarads |
| Capacitor 38 | 15 micromicrofarads |
| Capacitor 42 | 91 micromicrofarads |
| Capacitors 71 and 72 | 0.01 microfarad |
| Inductor 37 | 47 microhenries |
| Inductor 41 | 33 microhenries |
| Diode 75 | RCA Pt. 0147182-6 |

What is claimed is:

1. Apparatus for shifting the phase of an AC signal applied to an input terminal of a signal processing circuit while simultaneously reducing the amplitude at the output terminal of said processing circuit, comprising, a. an active device having an input, output and common electrodes, said common electrode being coupled to a point of reference potential, b. first means coupling the output electrode of said active device to said output terminal of said processing circuit, c. rectifying means including a first capacitor in series therewith coupled between said input terminal of said processing circuit and a point of reference potential, said rectifying means being poled to conduct only for certain polarity excursions of said AC signal applied to said input terminal of said processing circuit to develop a DC level across said capacitor, d. second means coupling said capacitor to said input electrode of said active device to render the same nonconducting in accordance with said DC level, e. switching means coupled to said second means, said switching means operative in a first mode to forward bias said rectifying means and said active device to cause said rectifying means to alter the phase of said AC signals at said input terminal of said processing circuit and said first means to reduce the amplitude at said output of said signal processing circuit in accordance with the forward biasing of said active device.

2. The apparatus according to claim 1, wherein said active device comprises a transistor having an input base electrode, a common emitter electrode and an output collector electrode.

3. The apparatus according to claim 1, wherein said first means coupling the output electrode of said active device to said output terminal of said processing circuit comprises a first resistive impedance.

4. The apparatus according to claim 1, wherein said processing circuit is a color demodulator configuration and said AC signal is the color reference subcarrier signal.

5. The apparatus according to claim 3 wherein said second means coupling said capacitor to said input electrode of said active device is a second resistive impedance.

6. The apparatus according to claim 1, wherein said rectifying means includes a third resistor and second a capacitor connected in parallel therewith to form an R.C. network, which network is coupled in series between said input terminal of said processing circuit and said rectifying means and said first capacitor in the order named.

7. Apparatus for shifting the phase of a reference signal applied to one input terminal of a demodulator while simultaneously reducing the amplitude at the output terminal of said demodulator, comprising, a. a transistor having a base, collector and emitter electrode, said emitter electrode being coupled to a point of reference potential, b. impedance means coupling said collector electrode to said output terminal of said demodulator, c. phase shifting means including a unidirectional current conducting device having first and second terminals, said first terminal being coupled to said one input terminal of said demodulator, said device poled to conduct only for certain polarity excursions of said reference signal at said one input terminal, d. a capacitor coupled between said second terminal of said unidirectional current conducting device and a point of reference potential, said capacitor charging to a DC level due to said conduction of said device in accordance with said certain polarity excursions of said reference signal, e. means coupling the junction between said capacitor and said unidirectional current conducting device to said base electrode of said transistor to render the same nonconductive in accordance with said DC level, f. switching means coupled to said means for forward biasing both said unidirectional device and said transistor during a first selectable mode, to cause said phase shifting means to shift the phase of said signals at said input of said demodulator and said impedance means serving to lower said amplitude at said demodulator output via said conducting transistor.

8. The apparatus according to claim 7 wherein said unidirectional current conducting device is a semiconductor diode.

9. In a color television receiver, including a chrominance channel having at least one color demodulator for demodulating chrominance signals contained in a composite television signal and applied to a first input terminal thereof with respect to a color reference oscillator signal applied to a second input terminal of said demodulator to obtain at an output terminal of said demodulator, color information signals of a first phase and amplitude, in combination therewith, apparatus for selectively altering the characteristics of said demodulators to provide color information signals of a phase and amplitude different from said first, comprising, a. a transistor having a base, collector and an emitter electrode, said emitter electrode being coupled to a point of reference potential, b. impedance means coupling said collector electrode to said output terminal of said demodulator, c. phase shifting means having first and second terminals and having said first terminal coupled to the input of said demodulator, d. a unidirectional current conductive device, having first and second terminals and having said first terminal coupled to said second terminal of said phase shifting means, e. a capacitive reactance coupled between said second terminal of said unidirectional current conductive device and a point of reference e potential, f. a high impedance device coupled between the base electrode of said transistor and said second terminal of said unidirectional current conductive device, and g. switching means coupled to the junction of said high impedance device and said unidirectional current conductive device for forward biasing both said device and said transistor in a first mode of operation and rendering the same nonconducting during a second mode, whereby when said unidirectional conductive device is forward biased said phase shifting means causes a predetermined phase shift for said reference oscillator signals applied to said second terminal of said demodulator and said forward biasing of said transistor causes said impedance means to simultaneously lower the level at said output terminal of said demodulator.

* * * * *